(12) United States Patent
Lee et al.

(10) Patent No.: US 10,495,252 B2
(45) Date of Patent: Dec. 3, 2019

(54) SUPPORTING FRAME

(71) Applicant: SYNCMOLD ENTERPRISE CORP., New Taipei (TW)

(72) Inventors: Yi-Xin Lee, New Taipei (TW); Ching-Hui Yen, New Taipei (TW); Chin-Chuan Lu, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 16/130,226

(22) Filed: Sep. 13, 2018

(65) Prior Publication Data

US 2019/0107244 A1    Apr. 11, 2019

(30) Foreign Application Priority Data

Oct. 7, 2017    (TW) .............................. 106214913 U

(51) Int. Cl.
*F16M 11/10*        (2006.01)
*F16M 11/20*        (2006.01)

(52) U.S. Cl.
CPC ......... *F16M 11/2021* (2013.01); *F16M 11/10* (2013.01); *F16M 2200/044* (2013.01)

(58) Field of Classification Search
CPC ............. F16M 2200/044; F16M 11/10; F16M 11/2021; F16M 11/2064
USPC ..... 248/292.11, 291.1, 280.11, 284.1, 276.1, 248/123.11
See application file for complete search history.

(56) References Cited

U.S. PATENT DOCUMENTS

| | | | |
|---|---|---|---|
| 7,252,277 B2 | 8/2007 | Sweere | |
| 7,392,965 B2 * | 7/2008 | Jung | F16M 11/125 248/125.2 |
| 7,562,851 B2 * | 7/2009 | Hein | F16M 11/2014 248/276.1 |
| 7,726,616 B2 * | 6/2010 | Zhang | F16M 11/2021 248/284.1 |
| 7,954,779 B2 * | 6/2011 | Coral | B08B 15/002 248/280.11 |
| 8,672,277 B2 * | 3/2014 | Hsu | F16M 11/10 248/121 |
| 9,820,571 B2 * | 11/2017 | Lindblad | A47B 81/062 |
| 10,190,724 B2 * | 1/2019 | Yen | F16M 11/10 |
| 2019/0107244 A1 * | 4/2019 | Lee | F16M 11/10 |

* cited by examiner

*Primary Examiner* — Jonathan Liu
*Assistant Examiner* — Guang H Guan
(74) *Attorney, Agent, or Firm* — Muncy, Geissler, Olds & Lowe, P.C.

(57) ABSTRACT

A supporting frame for holding a display includes a fixed base, a gas spring, a cam, a cantilever arm and a connecting element. The gas spring extends along a first direction and is disposed on the fixed base. The cam is against a pressure bearing head of the gas spring. The cantilever arm has a first end connecting to the cam. The connecting element is pivotally connected to the cantilever arm so as to hold the display. When the cantilever arm rotates toward the fixed base to cause the cam rotating, the gas spring is pressed. The gas spring is able to have various levels of elastic force and thus the display is adapted to stop at any height between a raised position and a lowered position.

8 Claims, 5 Drawing Sheets

SUPPORTING FRAME

CROSS REFERENCE TO RELATED APPLICATION

This application claims the benefits of the Taiwan Patent Application Serial Number 106214913, filed on Oct. 7, 2017, the subject matter of which is incorporated herein by reference.

BACKGROUND OF THE INVENTION

1. Field of the Invention

The present invention relates to a supporting frame for supporting a display. More particularly, the present invention relates to a supporting frame having a cam and a gas spring.

2. Description of Related Art

Disclosed in U.S. Pat. No. 7,252,277 is a conventional supporting frame having a proximal link, a distal link, a first strut, a second strut, a spring and a roller. The first strut and the second strut are pivoted on the proximal link and the distal link respectively so that the proximal link, the distal link, the first strut and the second strut integrally form a four-bar linkage. The first strut has a tube slot ("lumen" in U.S. Pat. No. 7,252,277) for the spring and the roller being disposed therein. The roller abuts against the proximal link. When the first strut and the second strut rotate with respect to the proximal link respectively, the roller rolls on a surface of the proximal link to deform the spring correspondingly so that various supporting power is generated when the supporting frame is moving up and down.

However, the disadvantage of the conventional supporting frame is that the interior of the supporting frame must form the tube slot for receiving the spring, the roller and a fix structure which is provided for fixing the spring and the roller in the tube slot. Therefore, the structure of the second strut is complicated, the assembly process of the second strut is difficult, and volume of the second strut is bulky.

Accordingly, the present invention provides a supporting frame with a novel structure which is highly required and has potential in the industry.

SUMMARY OF THE INVENTION

The object of the present invention is to provide a supporting frame comprising a cam and a gas spring. The cam and the gas spring are disposed near a base so that the structure of the cantilever arm can be uncomplicated. The supporting frame of the present invention is adapted to support the display and the display is adapted to stop at any height between a raised position and a lowered position.

To achieve the abovementioned objects, the present invention discloses a fixed base, a gas spring, and a cantilever arm. The fixed base has a base plate. The gas spring extends along a first direction and is disposed on the base plate. The gas spring has a pressure bearing head. The cantilever arm has a cam and an arm lever connected to the cam. The cam is disposed against the pressure bearing head. The arm lever is able to rotate between a raised position and a lowered position to cause the cam to rotate so that a position of the pressure bearing head is changed respectively and the gas spring is able to have various levels of elastic force, and thus the display stops at any height between a raised position and a lowered position.

The pressure bearing head has a column extended along a axis, a first end of the arm lever contacts with the cam, and the cam has a concave arc surface and a convex arc surface connected to the concave arc surface. When the cantilever arm is located at the raised position, the column of the pressure bearing head contacts with the concave arc surface, and when the arm lever rotates toward the base plate about a first shaft, the concave arc surface rotates simultaneously so that the column of the pressure bearing head moves apart from the concave arc surface and contacts with the convex arc surface so that the gas spring is pressed by the convex arc surface of the cam.

The column further has a rotating portion, and the rotating portion rotates about the axis and contacts with the cam.

The supporting frame further comprises a connecting element for holding a display. The connecting element is pivoted on a second end of the arm lever along a second shaft. The connecting element has a stop groove and the second end further has a stop cylinder being received into the stop groove.

The supporting frame further comprises a tube body. The tube body is disposed on the base plate to cover the gas spring. The cam is pivoted on the tube body through the first shaft, and the tube body further has an opening for the arm lever to extend out.

In one embodiment, the first direction is parallel to a normal direction of the base plate.

In another embodiment, the first direction is perpendicular to a normal direction of the base plate.

In a preferred embodiment, the supporting frame further comprises at least one connecting rod. The connecting rod has a third end and a fourth end corresponding to the third end. The third end is pivoted on the tube body along a third shaft and the fourth end is pivoted on the connecting element along a fourth shaft. The connecting rod, the connecting element, the cantilever arm and the tube body are connected together through the first shaft, the second shaft, the third shaft and the fourth shaft to be integrally configured to a four-bar linkage substantially.

In one embodiment, the number of the at least one connecting rod is two, the arm lever is disposed between the connecting rods, and the connecting rods are overlapped on the arm lever. The cam has a gap, the third shaft is pivoted on the third end of the connecting rods and the tube body through the gap, and the fourth end of the connecting rods is pivoted with the connecting element. Projections defined by the cantilever arm and the connecting rods are overlapped in a direction extended which the first shaft extends.

DETAILED DESCRIPTION OF THE PREFERRED EMBODIMENT

Figure 1:
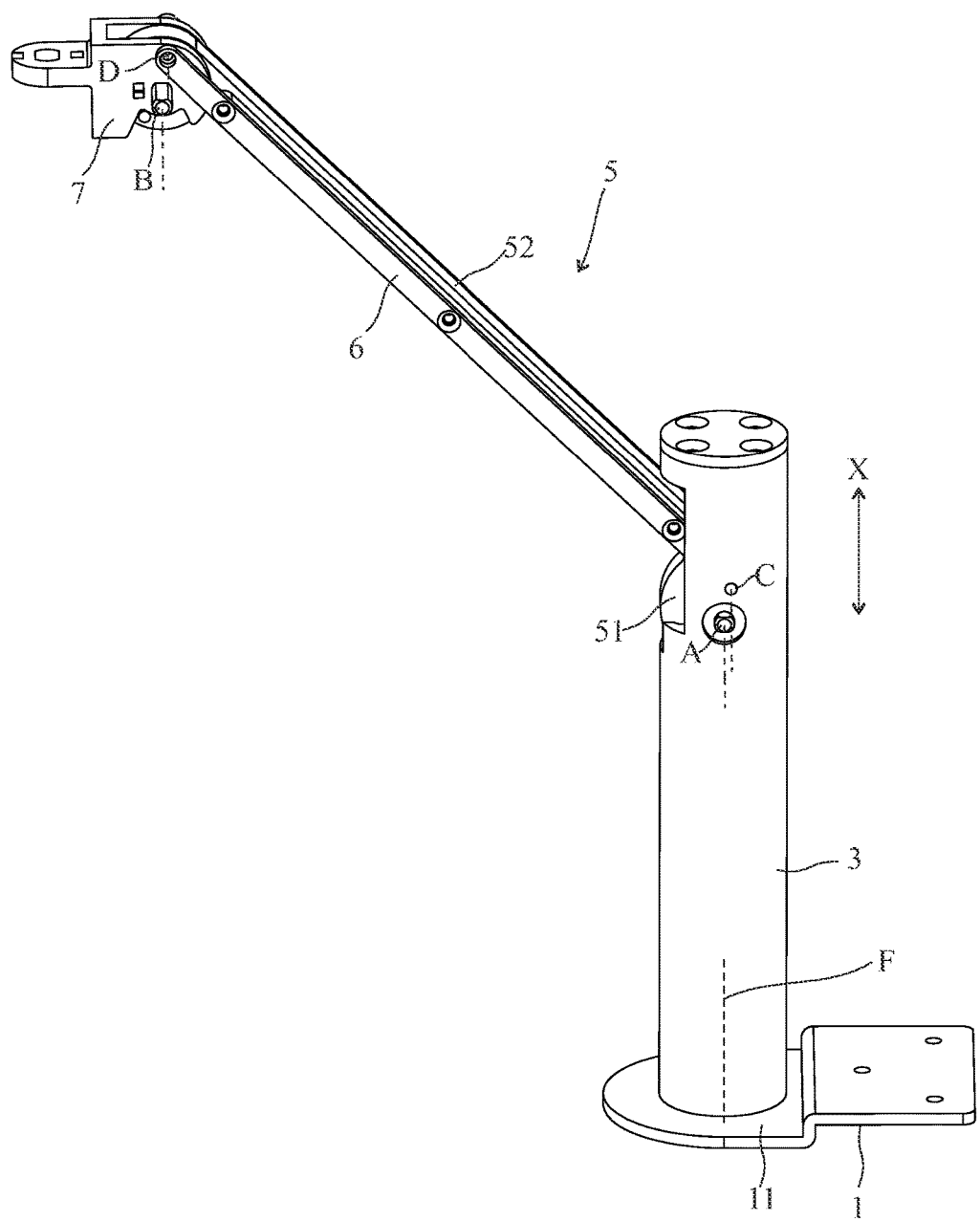
FIG. 1 is a perspective view of the supporting frame of the first embodiment of the present invention.
Figure 2:
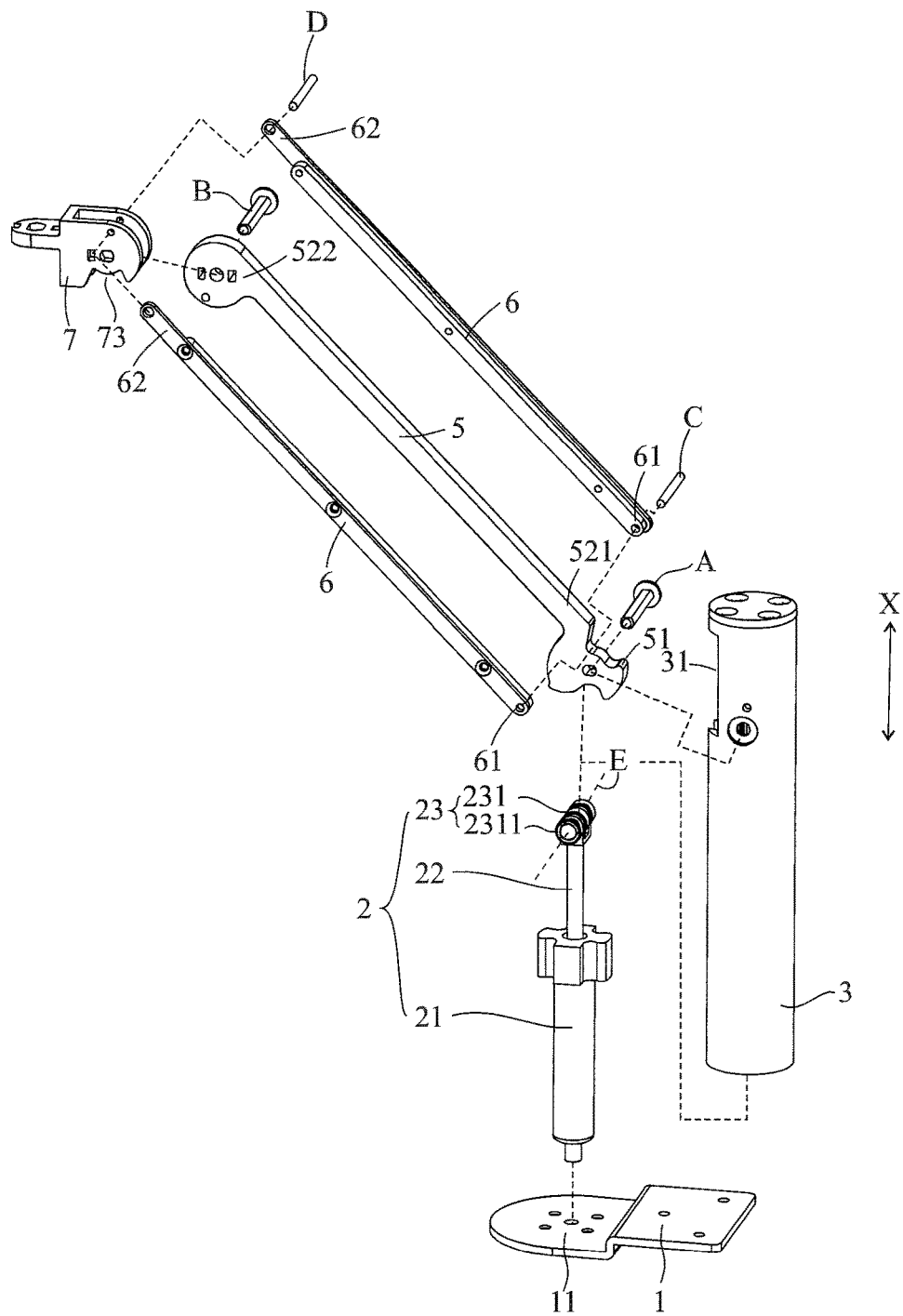
FIG. 2 is a partial explosive view of the supporting frame of the first embodiment of the present invention.
Figure 3:
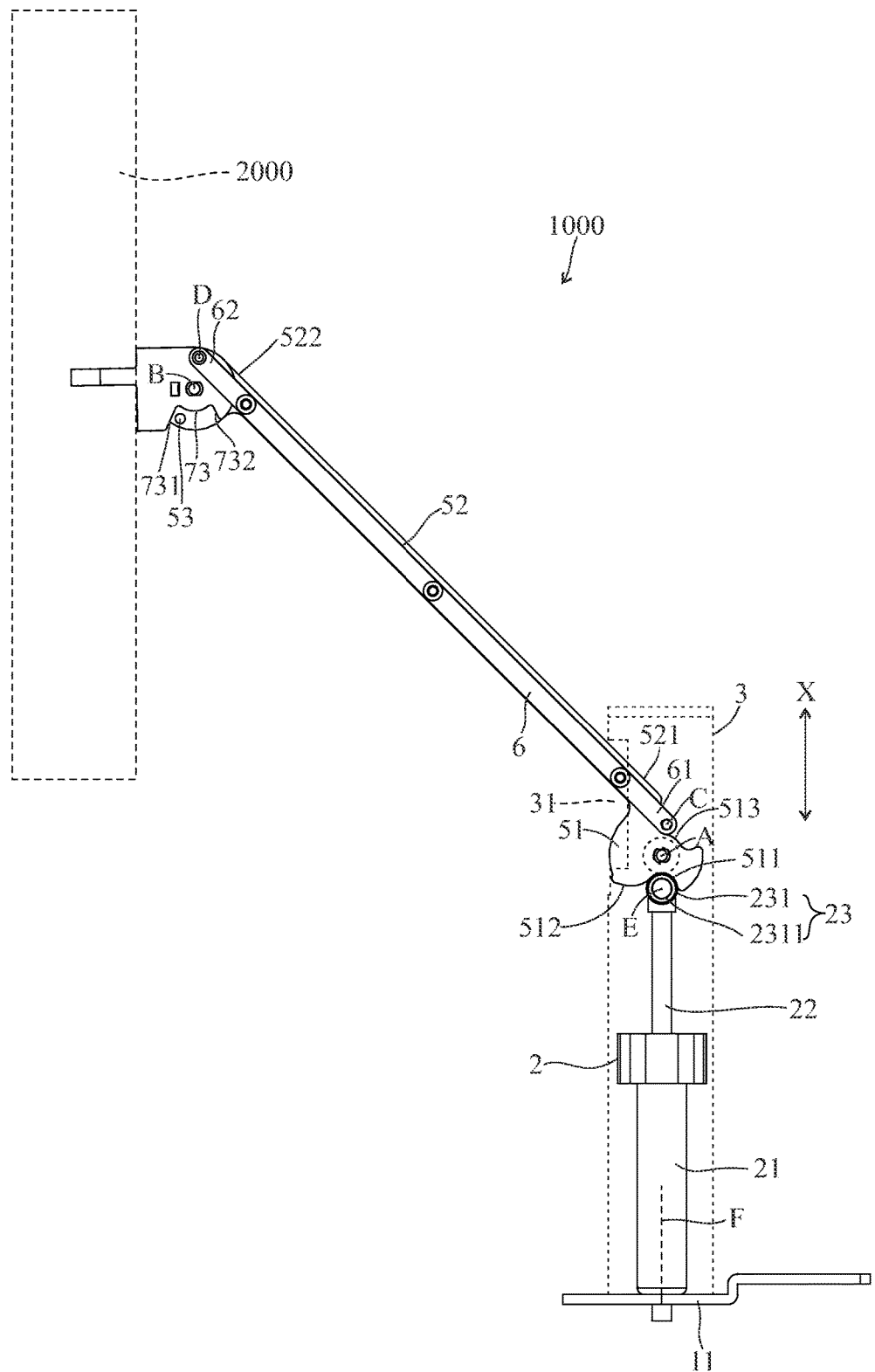
FIG. 3 is a moving state of the supporting frame of the first embodiment of the present invention.

Please refer to FIG. 1, FIG. 2 and FIG. 3, the supporting frame 1000 of a first embodiment of the present invention is used for holding a display 2000. The supporting frame 1000 comprises a fixed base 1, a gas spring 2, a tube body 3, a cantilever arm 5, two connecting rods 6, a connecting element 7, a first shaft A, a second shaft B, a third shaft C and a fourth shaft D. The detailed structure of each element and the relationship between the elements are further described herein below.

The fixed base 1 has a base plate 11 which is plate-like. A normal direction F is defined by the base plate 11. In the present embodiment, the base plate 11 has a plurality of holes for the screws to pass through so that the base plate 11 is adapted to fasten on a desktop or a working plane. In another embodiment, the fixed base can be a block body (with a certain weight) disposed on the desktop directly. In another embodiment, the fixed base can be a clamping means to fix on the desktop. Or, the fixed base in another embodiment is able to fasten on the wall through the screws.

The gas spring 2 extends along a first direction X and is disposed on the base plate 11. The first direction X is parallel to the normal direction F. The gas spring 2 has a pressure pipe 21, a piston rod 22 and a pressure bearing head 23. In the present embodiment, the pressure pipe 21 is disposed on the base plate 11, and the piston rod 22 passes through an end, away from the base plate 11, of the pressure pipe 21. The piston rod 22 connects to the pressure pipe 21 slidably. The other end of the piston rod 22 is fixed with the pressure bearing head 23. The pressure bearing head 23 has a column 231 extending along an axis E (that is, a direction of the axis E is not parallel to the first direction X). The column 231 has a rotating portion 2311. The rotating portion 2311 is adapted to rotate about the axis E. The tube body 3 is disposed on the base plate 11 and covers the gas spring 2.

Figure 4:
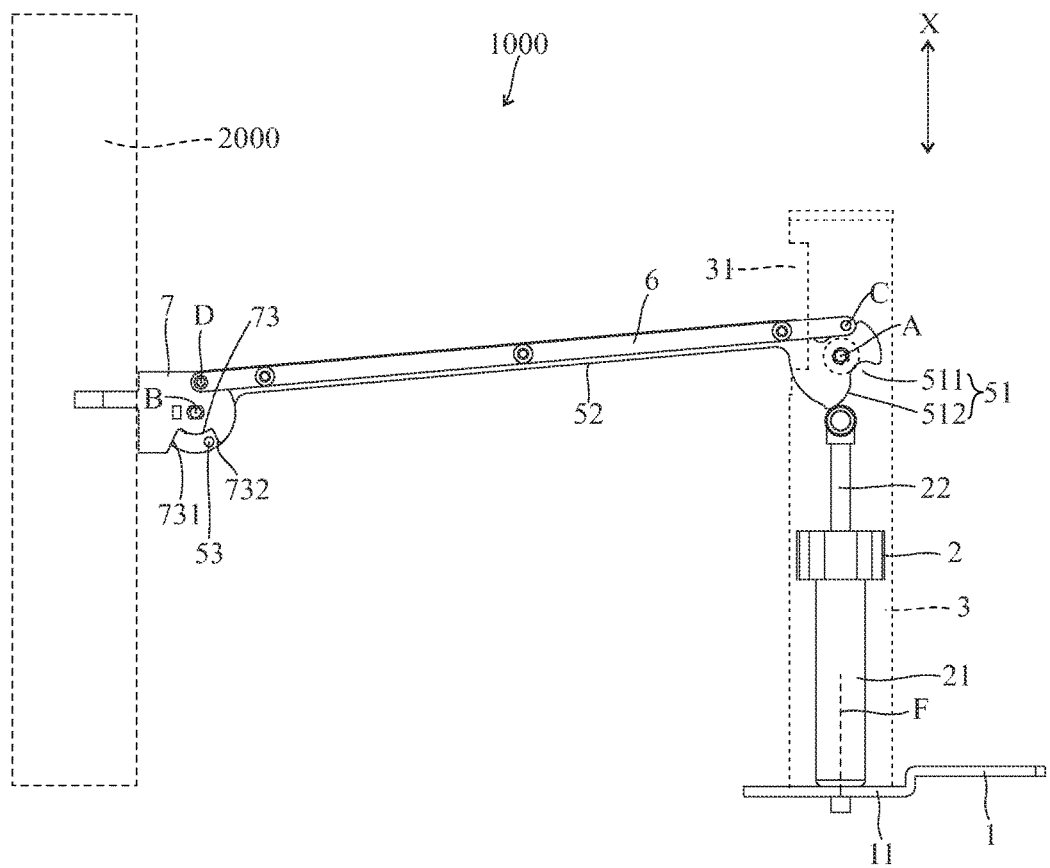
FIG. 4 is another moving state of the supporting frame of the first embodiment of the present invention.

The cantilever arm 5 has a cam 51 and an arm lever 52. The cam 51 is pivoted on the tube body 3 along the first shaft A. The arm lever 52 has a first end 521 and a second end 522 corresponding to the first end 521. The first end 521 of the arm lever 52 connects to the cam 51 and the arm lever 52 extends out from an opening 31 of the tube body 3. In the present embodiment, the cam 51 connects to the arm lever 52 integrally so that the cantilever arm 5 pivots along the first shaft A. That is to say, the cantilever arm 5 is adapted to pivot between a raised position as shown in FIG. 3 and a lowered position as shown in FIG. 4. The first shaft A is disposed on an inner surface of the tube body 3. A direction which the first shaft A extends is perpendicular to the first direction X. As shown in FIG. 3, the cam 51 has a concave arc surface 511 and a convex arc surface 512 connecting to the concave arc surface 511. When the cantilever arm 5 located at the raised position as shown in FIG. 3, the rotating portion 2311 is located in the concave arc surface 511 and the rotating portion 2311 contacts with the cam 51. The cam 51 abuts against the pressure bearing head 23 due to the piston rod 22 always pushes the pressure bearing head 23 away from the pressure pipe 21.

In the present embodiment, the arm lever 52 is disposed between the connecting rods 6 and the connecting rods 6 overlap to the arm lever 52 to contact with the arm lever 52. That is to say, the arm lever 52 is invisible in a side view of the supporting frame 1000. Therefore, the supporting frame 1000 is able to be slim. Each of the connecting rods 6 has a third end 61 and a fourth end 62 corresponding to the third end 61. The first end 521 of the arm lever 52 contacts with the cam 51. The cam 51 is pivoted on the tube body 31 along the first shaft A. The second end 522 of the arm lever 52 is pivoted on the connecting element 7 along the second shaft B. The cam 51 has a gap 513 corresponding to the concave arc surface 511. The third shaft C is pivoted on the third ends 61 of the connecting rods 6 and the tube body 3 through the gap 513 avoiding connecting to the cam 51. The fourth end 62 is pivoted on the connecting element 7 through the fourth shaft D away from the second end 522 of the arm lever 52. The first shaft A, the second shaft B, the third shaft C and the fourth shaft D are parallel to one another and are perpendicular to the first direction X.

The above mentioned elements are pivoted together and rotate along the first shaft A, the second shaft B, the third shaft C and the fourth shaft D so as to be integrally configured as a four-bar linkage. The first strut and the second strut of the conventional four-bar linkage as shown in U.S. Pat. No. 7,252,277 depart from each other in a side view so that volume of the conventional four-bar linkage is bulky. The cantilever arm 5 overlaps the connecting rods 6 in a side view (projections defined by the cantilever arm 5 and the connecting rods 6 are overlapped in a direction which the first shaft A extends) so that shape of the supporting frame 1000 of the present invention is uncomplicated.

As shown in FIG. 3 and FIG. 4, the display 2000 (shown as the dotted lines) connects to the connecting element 7 away from the cantilever arm 5. The cantilever arm 5 rotates from the raised position to the lowered position. The cam 51 rotates along the axis E and then the concave arc surface 511 of the cam 51 rotates so that the column 231 and the rotating portion 2311 of the pressure bearing head 23 move away from the concave arc surface 511. The convex arc surface 512 of the cam 51 contacts with the rotating portion 2311. That is, the arm lever 52 rotates to cause the cam 51 to push the pressure bearing head 23 so as to push the piston rod 22 slides in the pressure pipe 21. Therefore, the gas spring 2 is pressed by the motion of the cam 51. The curvatures of the convex arc surface 512 are not constant. When the cantilever arm 5 rotates more adjacent to the lowered position, the lowered degree of the pressure bearing head 23 (and the piston rod 22) being pressed by the cam 51 increases. The elastic force of the gas spring 2 is thus synchronously increasing during the above-mentioned rotating process of the cam 5. As a consequence, the torque generated by the gas spring 2 can be balanced with the torque generated by the weight of the display 2000 at any position so that the display 2000 is adapted to stop at any height between a raised position and a lowered position. In another embodiment, number of the gas spring 2 and elastic force of the gas spring 2 can be adjusted according the needs (such as according to weight of the display 2000).

In addition, friction force is generated when the cam 51 moves with respect to the pressure bearing head 23. Since the rotating portion 2311 is rotatable, the friction force can be reduced so as to avoid abrasion between the cam 51 and the pressure bearing head 23. However, the rotating portion 2311 can be omitted in another embodiment, and the column 231 is adapted to slide from the concave arc surface 511 to the convex arc surface 512 so that the gas spring 2 can be pressed by the cam 51.

In the present embodiment, the connecting element 7 has a stop groove 73. The stop groove 73 has a seventh end 731 and an eighth end 732 corresponding to the seventh end 731. The second end 52 of the cantilever arm 5 further has a stop cylinder 53. The stop cylinder 53 is received into the stop groove 73 slidably. When the cantilever arm 5 is at the raised position, the stop cylinder 53 is located at the seventh end 731 of the stop groove 73. When the cantilever arm 5 is at the lowered position, the stop cylinder 53 is adapted to slide from the seventh end 731 to the eighth end 732. That is to say, a rotation angle of the display 2000 is limited by the stop cylinder 53 and the stop groove 73. However, the stop groove 73 and the stop cylinder 53 can be omitted in another embodiment of the present invention.

Figure 5:
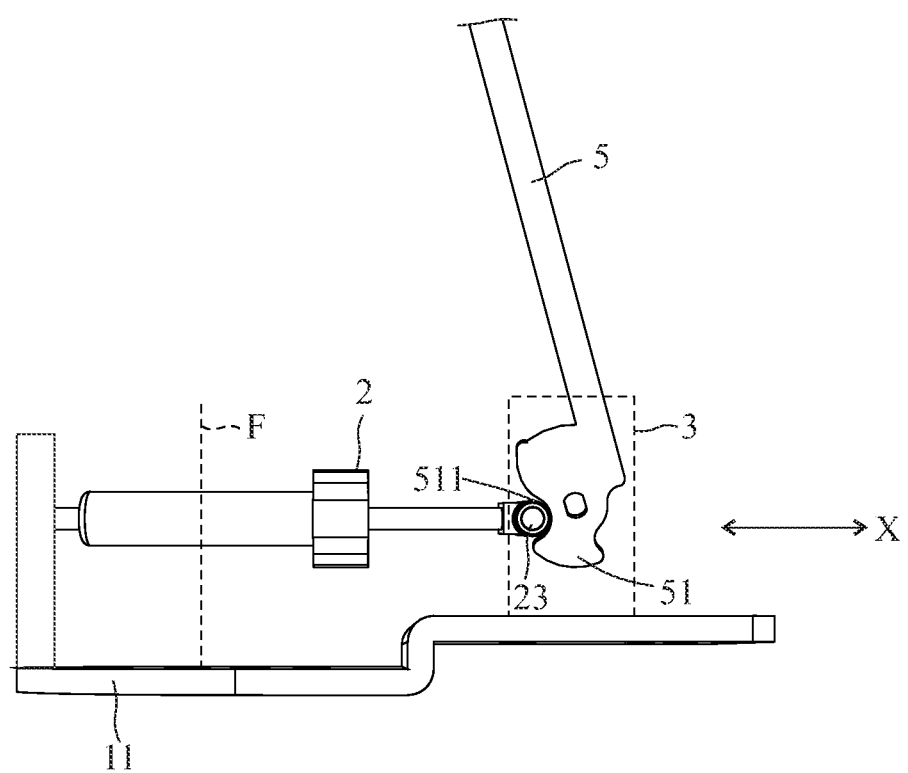
FIG. 5 is a perspective view of the supporting frame of the second embodiment of the present invention.

The second embodiment of the present invention is shown as FIG. 5. The gas spring 2 extends along the first direction X and is fixed on the base plate 11, and the first direction X is perpendicular to the normal direction F of the base plate 11. The cam 51 is pivoted on the tube body 3 and connects to the arm lever 52. Compared with the location of the cam 51 in the first embodiment, the cam 51 of the present embodiment is arranged to rotate an angle so that the pressure bearing head 23 of the gas spring 2 is located in the concave arc surface 511 of the cam 51. The relative movement between the pressure bearing head 23 and the cam 51 of the present embodiment is the same with the pressure bearing head 23 and the cam 51 of the first embodiment. According to the above mentioned structure, the arm level 52 is adapted to rotate to cause the cam 51 to press the gas spring 2.

In conclusion, in the present invention, the cam is disposed on an end of the cantilever arm, and an angle of the cam with respect to the first end of arm lever is able to be adjusted. The gas spring is arranged on the cam, under the cam or beside the cam corresponding to the angle of the cam. In addition, the gas spring is disposed between the cam and the base. According to the above mentioned descriptions, the cantilever arm is adapted to have a supporting function, and configuration of the cantilever arm is uncomplicated. The tube slot of the conventional supporting frame is able to be removed. Assembly time of the supporting frame of the present invention is able to be shortened.

Although the present invention has been explained in relation to its preferred embodiment, it is able to be understood that many other possible modifications and variations can be made without departing from the spirit and scope of the invention as hereinafter claimed.

What is claimed is:

1. A supporting frame for holding a display, the supporting frame comprising:
    a fixed base having a base plate;
    a gas spring extending along a first direction, being disposed on the base plate, and having a pressure bearing head;
    a cantilever arm having a cam and an arm lever connected to the cam, the cam being disposed against the pressure bearing head;
    a tube body being disposed on the base plate, covering the gas spring, and having an opening for the arm lever to extend out; and
    a connecting element pivotally connected to the arm lever for holding the display;
    wherein the arm lever extends out through the opening of the tube body and the cam is pivotally connected to the tube body through a first shaft;
    wherein the arm lever is able to rotate with respect to the tube body between a raised position and a lowered position to cause the cam to rotate and to change a position of the pressure bearing head so that the gas spring is able to have various levels of elastic force to allow the display to stop at any height between the raised position and the lowered position;
    wherein the pressure bearing head has a column extending along an axis, a first end of the arm lever contacts with the cam, and the cam has a concave arc surface and a convex arc surface connected to the concave arc surface, when the lever arm is located at the raised position, the column of the pressure bearing head contacts with the concave arc surface, and when the arm lever rotates toward the base plate about the first shaft, the concave arc surface rotates simultaneously so that the column of the pressure bearing head moves apart from the concave arc surface and contacts with the convex arc surface so that the gas spring is pressed by the convex arc surface of the cam.

2. The supporting frame as claimed in claim 1, wherein the column further has a rotating portion, and the rotating portion is rotatable about the axis and contacts with the cam.

3. The supporting frame as claimed in claim 2, wherein the connecting element is pivotally connected to a second end of the arm lever along a second shaft.

4. The supporting frame as claimed in claim 3, wherein the connecting element further has a stop groove, and the second end of the arm lever further has a stop cylinder being received into the stop groove.

5. The supporting frame as claimed in claim 4, wherein the first direction is perpendicular to the base plate.

6. The supporting frame as claimed in claim 4, further comprising at least one connecting rod, wherein the at least one connecting rod has a third end and a fourth end corresponding to the third end, the third end is pivotally connected to the tube body along a third shaft and the fourth end is pivotally connected to the connecting element along a fourth shaft, and wherein the at least one connecting rod, the connecting element, the cantilever arm and the tube body are connected together through the first shaft, the second shaft, the third shaft and the fourth shaft and are configured as a substantially four-bar linkage.

7. The supporting frame as claimed in claim 4, further comprising two connecting rods, wherein each of the two connecting rods has a third end and a fourth end corresponding to the third end, the third end of each of the two connecting rods is pivotally connected to the tube body along a third shaft, and the fourth end of each of the two connecting rods is pivotally connected to the connecting element along a fourth shaft, wherein the connecting element, the cantilever arm, the tube body and one of the two connecting rods are connected together through the first shaft, the second shaft, the third shaft and the fourth shaft and are configured as a substantially four-bar linkage, wherein the arm lever is disposed between the two connecting rods, and the two connecting rods are overlapped on the arm lever, and wherein the cam has a gap, the third shaft is pivotally connected to the third ends of the two connecting rods and the tube body through the gap, and the fourth ends of the two connecting rods are pivotally connected to the connecting element.

8. The supporting frame as claimed in claim 7, wherein the cantilever arm and the two connecting rods are overlapped in a direction in which the first shaft extends.

* * * * *